US009773626B1

(12) United States Patent
Wang

(10) Patent No.: US 9,773,626 B1
(45) Date of Patent: Sep. 26, 2017

(54) KEYBOARD

(71) Applicant: Primax Electronics Ltd., Neihu, Taipei (TW)

(72) Inventor: Yi-Chen Wang, Taipei (TW)

(73) Assignee: PRIMAX ELECTRONICS LTD., Neihu, Taipei (TW)

( * ) Notice: Subject to any disclaimer, the term of this patent is extended or adjusted under 35 U.S.C. 154(b) by 0 days.

(21) Appl. No.: 15/161,038

(22) Filed: May 20, 2016

(30) Foreign Application Priority Data

Mar. 25, 2016 (TW) .............................. 105109436 A

(51) Int. Cl.
| | | |
|---|---|---|
| *H01H 13/705* | (2006.01) | |
| *H01H 13/10* | (2006.01) | |
| *H01H 13/85* | (2006.01) | |
| *G06F 1/16* | (2006.01) | |

(52) U.S. Cl.
CPC ......... *H01H 13/705* (2013.01); *G06F 1/1662* (2013.01); *H01H 13/10* (2013.01); *H01H 13/85* (2013.01)

(58) Field of Classification Search
CPC ...... H01H 13/705; H01H 13/10; H01H 13/85; H01H 2221/026; H01H 3/125; G06F 1/1662

USPC ......... 200/5 A, 341, 344, 310–314, 512, 516
See application file for complete search history.

(56) References Cited

U.S. PATENT DOCUMENTS

| | | | | |
|---|---|---|---|---|
| 5,735,390 A * | 4/1998 | Takagi | ................... | H01H 3/125 200/341 |
| 6,068,416 A * | 5/2000 | Kumamoto | ............ | H01H 3/125 200/344 |
| 7,022,927 B2 * | 4/2006 | Hsu | ....................... | G06F 1/1615 200/344 |

* cited by examiner

*Primary Examiner* — Edwin A. Leon
(74) *Attorney, Agent, or Firm* — Kirton McConkie; Evan R. Witt

(57) ABSTRACT

A keyboard includes a base plate, plural keycaps, plural scissors-type connecting elements and a sliding plate. Each scissors-type connecting element has a bulge. The gliding plate has plural position-limiting structures. The keyboard is installed on a notebook computer and connected with a top cover of the notebook computer. For operating the keyboard, the bulge is received in a first step part of the position-limiting structure. Consequently, the keycap is at a higher height. Since the keycap is at a higher height, the movable distance of the keycap is large enough to provide better tactile feel. For storing the keyboard, the bulge of the scissors-type connecting element is moved to the second step part of the position-limiting structure. Consequently, the height of the keycap is reduced, and the keyboard has a slim appearance.

12 Claims, 9 Drawing Sheets

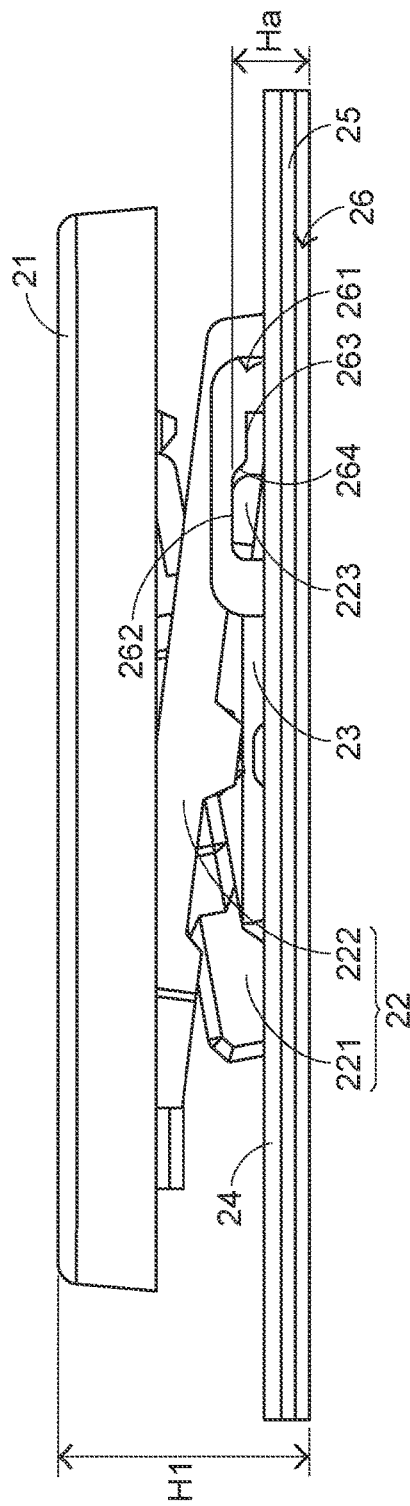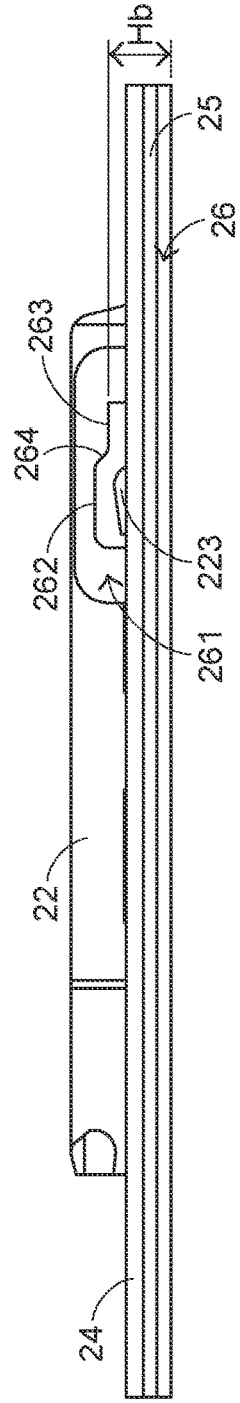
FIG.5
FIG.6

KEYBOARD

FIELD OF THE INVENTION

The present invention relates to a keyboard, and more particularly to a slim-type keyboard.

BACKGROUND OF THE INVENTION

Generally, the widely-used peripheral input device of a computer system includes for example a mouse, a keyboard, a trackball, or the like. Via the keyboard, characters or symbols can be directly inputted into the computer system. As a consequence, most users and most manufacturers of input devices pay much attention to the development of keyboards. As known, a keyboard with scissors-type connecting elements is one of the widely-used keyboards.

The structure of a keyboard with scissors-type connecting elements will be illustrated as follows. For succinctness, only one key structure of the keyboard is shown. FIG. 1 is a schematic side cross-sectional view illustrating a key structure of a conventional keyboard. As shown in FIG. 1, the conventional key structure 1 comprises a keycap 11, a scissors-type connecting element 12, a rubbery elastomer 13, a membrane switch circuit member 14 and a base plate 15. The keycap 11, the scissors-type connecting element 12, the rubbery elastomer 13 and the membrane switch circuit member 14 are supported by the base plate 15. The scissors-type connecting element 12 is used for connecting the base plate 15 and the keycap 11.

The membrane switch circuit member 14 comprises plural key intersections (not shown). When one of the plural key intersections is triggered, a corresponding key signal is generated. The rubbery elastomer 13 is disposed on the membrane switch circuit member 14. Each rubbery elastomer 13 is aligned with a corresponding key intersection. When the rubbery elastomer 13 is depressed, the rubbery elastomer 13 is subjected to deformation to push the corresponding key intersection of the membrane switch circuit member 14. Consequently, the corresponding key signal is generated.

The scissors-type connecting element 12 is arranged between the base plate 15 and the keycap 11, and the base plate 15 and the keycap 11 are connected with each other through the scissors-type connecting element 12. The scissors-type connecting element 12 comprises a first frame 121 and a second frame 122. A first end of the first frame 121 is connected with the keycap 11. A second end of the first frame 121 is connected with the base plate 15. The rubbery elastomer 13 is enclosed by the scissors-type connecting element 12. Moreover, the first frame 121 comprises a first keycap post 1211 and a first base plate post 1212. The first frame 121 is connected with the keycap 11 through the first keycap post 1211. The first frame 121 is connected with the base plate 15 through the first base plate post 1212. The second frame 122 is combined with the first frame 121. A first end of the second frame 122 is connected with the base plate 15. A second end of the second frame 122 is connected with the keycap 11. Moreover, the second frame 122 comprises a second keycap post 1221 and a second base plate post 1222. The second frame 122 is connected with the keycap 11 through the second keycap post 1221. The second frame 122 is connected with the base plate 15 through the second base plate post 1222.

The operations of the conventional key structure 1 in response to the depressing action of the user will be illustrated as follows. Please refer to FIG. 1 again. When the keycap 11 is depressed, the keycap 11 is moved downwardly to push the scissors-type connecting element 12 in response to the depressing force. As the keycap 11 is moved downwardly relative to the base plate 15, the keycap 11 pushes the corresponding rubbery elastomer 13. At the same time, the rubbery elastomer 13 is subjected to deformation to push the membrane switch circuit member 14 and trigger the corresponding key intersection of the membrane switch circuit member 14. Consequently, the membrane switch circuit member 14 generates a corresponding key signal. When the keycap 11 is no longer depressed by the user, no external force is applied to the keycap 11 and the rubbery elastomer 13 is no longer pushed by the keycap 11. In response to the elasticity of the rubbery elastomer 13, the rubbery elastomer 13 is restored to its original shape to provide an upward elastic restoring force. Consequently, the keycap 11 is returned to its original position where it is not depressed.

Recently, the general trends of designing electronic devices and their peripheral devices are toward slimness, light weightiness an easy portability. Consequently, keyboard devices and other peripheral devices need to meet the requirements of slimness. For achieving this purpose, the manufacturers make efforts in minimizing the thickness of the keyboard. Conventionally, two approaches are used to reduce the thickness of the keyboard. In a first approach, the thicknesses of some components or all components of the key structure are decreased. In a second approach, the movable distance of the keycap (also referred as a travelling distance) is shortened. However, these approaches still have some drawbacks. In case that the first approach is adopted, the structural strength of the key structure is impaired, and thus the key structure is easily damaged. In case that the second approach is adopted, the tactile feel of depressing the key structure is deteriorated. In other words, it is difficult to reduce the thickness of the keyboard while obtaining the desired tactile feel.

Therefore, there is a need of providing a keyboard with reduced thickness and enhanced tactile feel.

SUMMARY OF THE INVENTION

The present invention provides a keyboard with reduced thickness and enhanced tactile feel.

In accordance with an aspect of the present invention, there is provided a keyboard. The keyboard includes plural keycaps, plural scissors-type connecting elements, a base plate and a sliding plate. The plural keycaps are partially exposed outside the keyboard. Each scissors-type connecting element is aligned with a corresponding keycap and connected with the corresponding keycap. At least one of the plural scissors-type connecting elements has a bulge. The bulge is protruded externally from a sidewall of the corresponding scissors-type connecting element. The base plate is connected with the plural scissors-type connecting elements. The plural keycaps and the plural scissors-type connecting elements are supported by the base plate. The sliding plate is disposed under the base plate. When the sliding plate is pushed, the sliding plate is moved relative to the base plate. The sliding plate includes plural position-limiting structures corresponding to respective bulges. The plural bulges are inserted into the corresponding position-limiting structures. When the sliding plate is moved relative to the base plate, a relative position between each bulge and the corresponding position-limiting structure is changed, so that a height of the corresponding keycap is changed.

In an embodiment, each of the plural position-limiting structures includes a first step part, a second step part and a junction part. The first step part is located at a first side of the position-limiting structure to receive the corresponding bulge. The second step part is located at a second side of the position-limiting structure to receive the corresponding bulge. The second step part is lower than the first step part. The junction part is arranged between the first step part and the second step part. When the sliding plate is moved relative to the base plate in a first direction, the bulge is pushed into the second step part by the junction part.

From the above descriptions, the keyboard of the present invention has the function of changing the heights of the keys. For operating the keyboard, the bulge of the scissors-type connecting element is controlled to be received in the first step part of the position-limiting structure. Consequently, the keycap is at a higher height. Since the height of the keycap is not limited during the normal operation of the keyboard, the movable distance of the keycap is still large enough to provide better tactile feel. For storing the keyboard, the bulge of the scissors-type connecting element is controlled to be received in the second step part of the position-limiting structure. Consequently, the height of the keycap is reduced, and the keyboard has a slim appearance. In other words, the keyboard of the present invention is capable of effectively solving the drawbacks of the conventional technologies.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 5 is a schematic side view illustrating a portion of the keyboard according to the first embodiment of the present invention;

FIG. 6 is a schematic side view illustrating a portion of the keyboard according to the first embodiment of the present invention, in which the keycap is depressed and the keycap is not shown;

DETAILED DESCRIPTION OF THE PREFERRED EMBODIMENT

For solving the drawbacks of the conventional technologies, the present invention provides a keyboard with enhanced structural strength and slim appearance.

Figure 1:
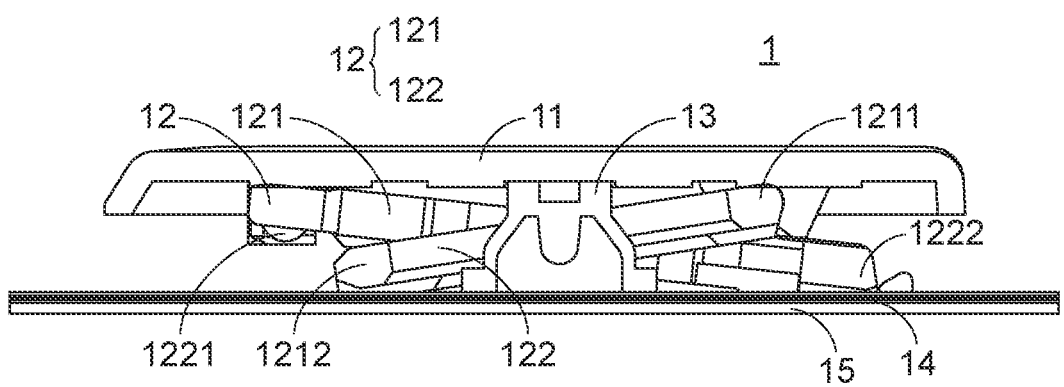
FIG. 1 is a schematic side cross-sectional view illustrating a key structure of a conventional keyboard.
Figure 2:
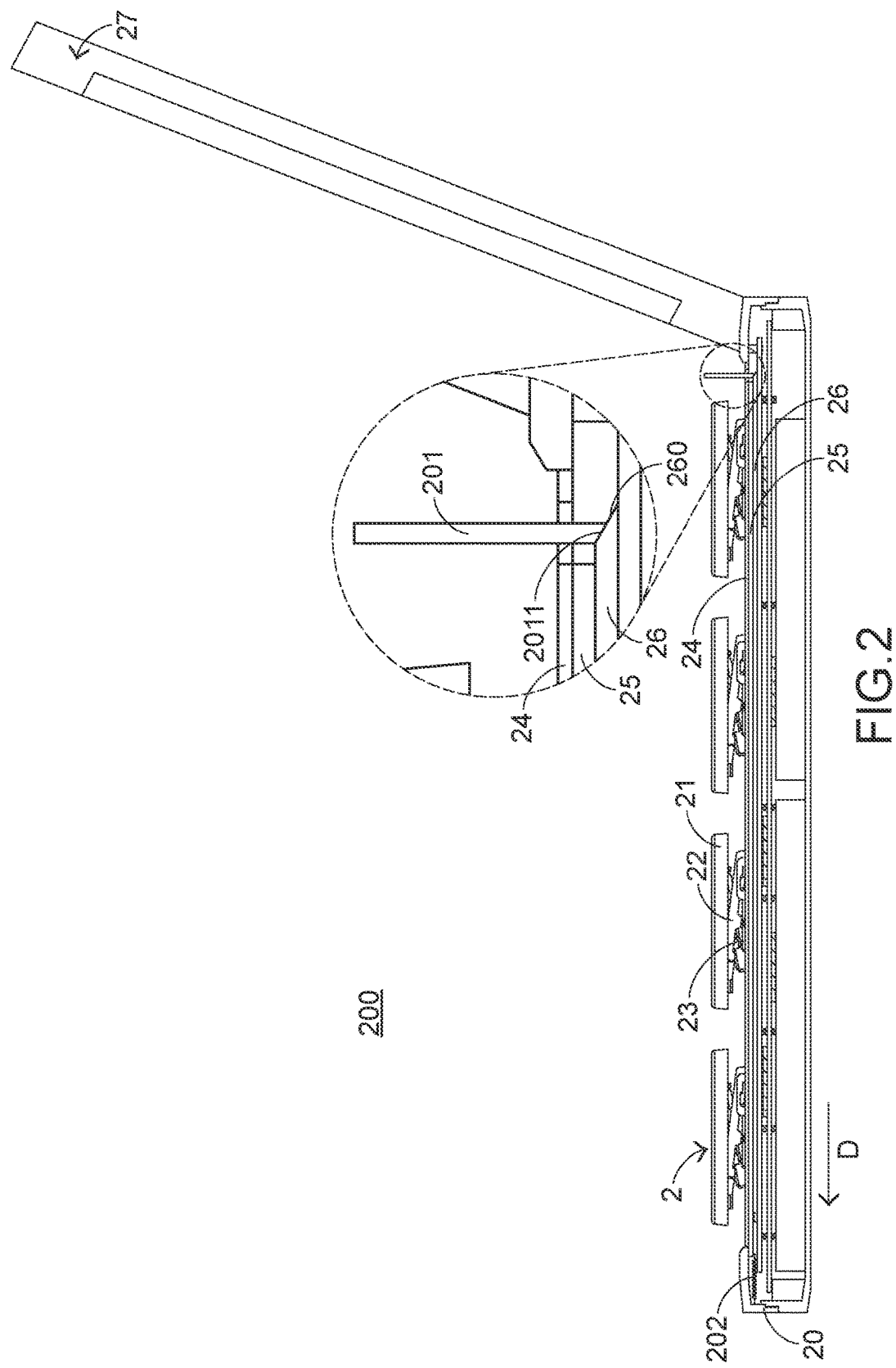
FIG. 2 is a schematic side cross-sectional view illustrating a keyboard according to a first embodiment of the present invention.
Figure 3:
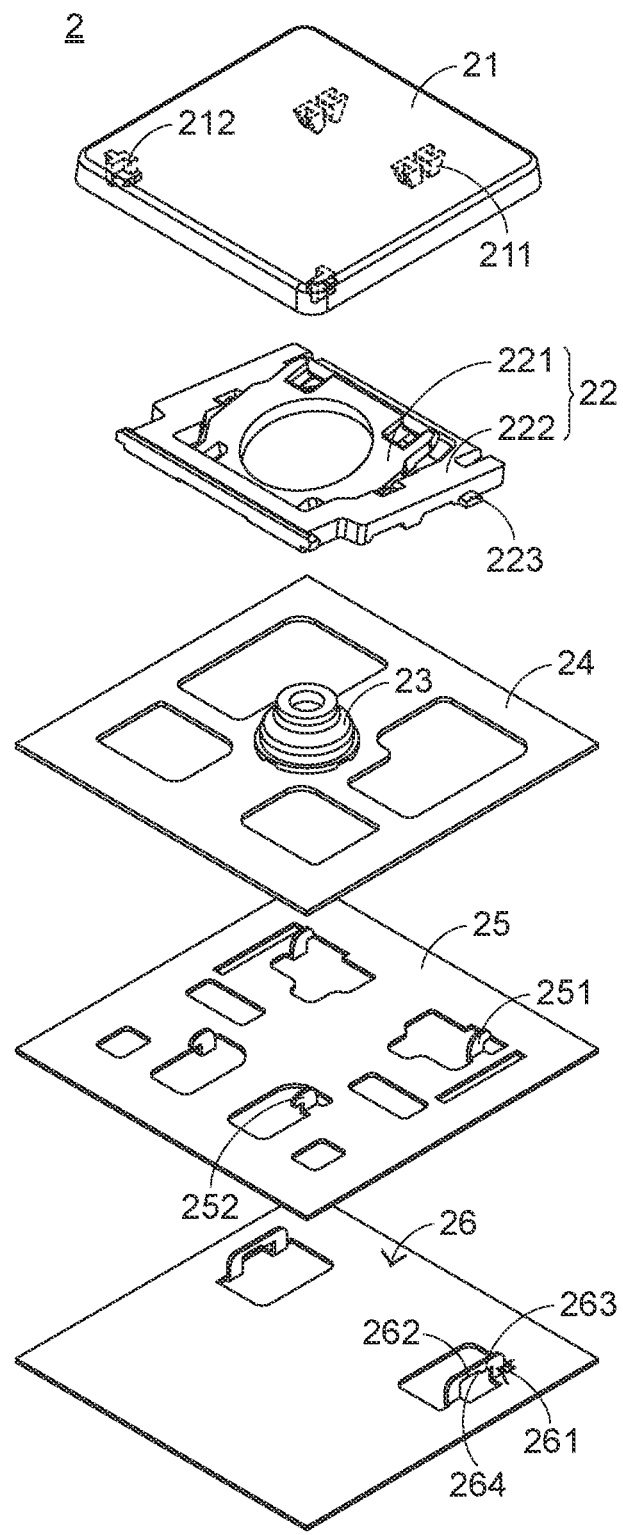
FIG. 3 is a schematic exploded view illustrating a portion of the keyboard according to the first embodiment of the present invention.

FIG. 2 is a schematic side cross-sectional view illustrating a keyboard according to a first embodiment of the present invention. FIG. 3 is a schematic exploded view illustrating a portion of the keyboard according to the first embodiment of the present invention. Please refer to FIGS. 2 and 3. The keyboard 2 is installed on a notebook computer 200. The keyboard 2 comprises a keyboard base 20, plural keycaps 21, plural scissors-type connecting elements 22, plural elastic elements 23, a membrane switch circuit member 24, a base plate 25 and a sliding plate 26. The keyboard base 20 is connected with a top cover 27. The top cover 27 is rotatable relative to the keyboard base 20 to cover the keyboard base 20. Moreover, an outer shell of the notebook computer 200 is defined by the keyboard base 20 and the top cover 27 collaboratively.

The plural keycaps 21 are exposed outside the keyboard 2 so as to be pressed by the user. Each scissors-type connecting element 22 is aligned with a corresponding keycap 21 and connected with the corresponding keycap 21. Each keycap 21 comprises a first keycap hook 211 and a second keycap hook 212. The first keycap hook 211 is located at a first side of the keycap 21. The second keycap hook 212 is located at a second side of the keycap 21. The base plate 25 is connected with the plural scissors-type connecting elements 22. The plural keycaps 21, the plural scissors-type connecting elements 22, the plural elastic elements 23 and the membrane switch circuit member 24 are supported by the base plate 25. Moreover, the base plate 25 comprises plural first base plate hooks 251 and plural second base plate hooks 252.

Please refer to FIGS. 2 and 3 again. The scissors-type connecting member 22 comprises an inner frame 221 and an outer frame 222. A first end of the inner frame 221 is connected with the first keycap hook 211 of the keycap 21. A second end of the inner frame 221 is connected with the second base plate hooks 252 of the base plate 25. The outer frame 222 and the inner frame 221 are combined with each other. Moreover, the outer frame 222 is rotatable relative to the inner frame 221. A first end of the outer frame 222 is connected with the first base plate hooks 251 of the base plate 25. A second end of the outer frame 222 is connected with the second keycap hook 212 of the keycap 21. The outer frame 222 further comprises a bulge 223. The bulge 223 is disposed on a sidewall of the outer frame 222 and protruded externally from the sidewall of the outer frame 222. Preferably but not exclusively, the bulge 223 is integrally formed with the outer frame 222.

Each elastic element 23 is aligned with a corresponding keycap 21 and disposed under the corresponding keycap 21. The membrane switch circuit member 24 is disposed over the base plate 25, and contacted with the plural elastic elements 23. When the membrane switch circuit member 24 is triggered by one of the plural elastic elements 23, a corresponding key signal is generated. The structure of the membrane switch circuit member 24 is similar to that of the conventional key structure, and is not redundantly described herein.

In this embodiment, the elastic elements 23 are rubbery elastomers. Moreover, the sliding plate 26 is disposed under the base plate 25. When the sliding plate 26 is pushed, the sliding plate 26 is moved relative to the base plate 25. Moreover, the sliding plate 26 comprises plural position-limiting structures 261 corresponding to respective bulges 223. The bulge 223 is inserted into the corresponding position-limiting structure 261. When the sliding plate 26 is moved relative to the base plate 25, the relative positions between the bulges 223 and the corresponding position-limiting structures 261 are changed. Consequently, the height of the keycap 21 is correspondingly changed.

Figure 4:
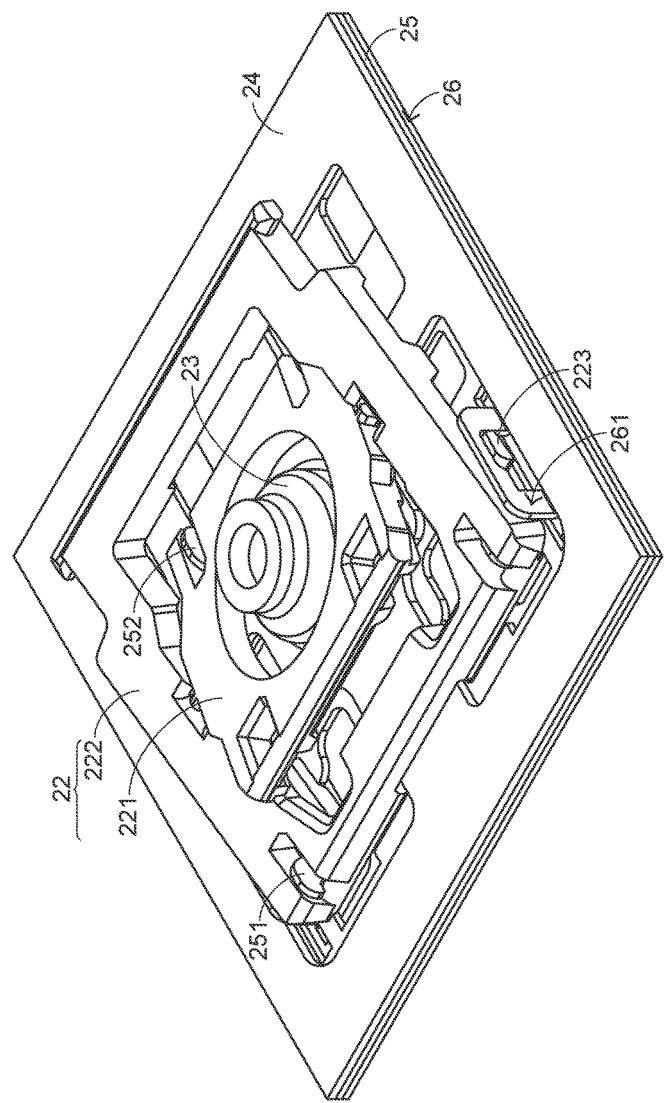
FIG. 4 is a schematic assembled view illustrating a portion of the keyboard according to the first embodiment of the present invention.

FIG. 4 is a schematic assembled view illustrating a portion of the keyboard according to the first embodiment of the present invention. FIG. 5 is a schematic side view illustrating a portion of the keyboard according to the first embodiment of the present invention. Please refer to FIGS. 4 and 5. Each position-limiting structure 261 comprises a first step part 262, a second step part 263 and a junction part 264. The first step part 262 is located at a first side of the position-limiting structure 261. The first step part 262 is used for receiving the bulge 223. The second step part 263 is located at a second side of the position-limiting structure 261. The second step part 263 is also used for receiving the bulge 223. The height Hb of the second step part 263 is lower than the height Ha of the first step part 262 with respect to a bottom surface of the sliding plate 26. The junction part 264 is arranged between the first step part 262 and the second step part 263. In case that the sliding plate 26 is moved relative to the base plate 25 in a first direction D, the bulge 223 is pushed into the second step part 263 by the junction part 264.

Please refer to FIG. 2 again. The keyboard base 20 comprises plural linkage elements 201. For succinctness, only one linkage element 201 is shown in FIG. 2. The linkage element 201 is disposed within the keyboard base 20 and partially protruded out of the keyboard base 20. The part of the linkage element 201 within the keyboard base 20 is contacted with the sliding plate 26. In this embodiment, a bottom of the linkage element 201 has a first guiding slant 2011, and a lateral side of the sliding plate 26 has a second guiding slant 260. The first guiding slant 2011 and the second guiding slant 260 are contacted with each other. While the top cover 27 is closed to cover the keyboard base 20, the top cover 27 is rotated downwardly to push the plural linkage elements 201. As the plural linkage elements 201 are pushed by the top cover 27, the second guiding slant 260 of the sliding plate 26 is pushed by the first guiding slants 2011 of the plural linkage elements 201. Consequently, the sliding plate 26 is moved relative to the base plate 25 in the first direction D.

The operations of the key structure 3 in response to the depressing action of the user will be illustrated as follows. Please also refer to FIGS. 5 and 6. FIG. 6 is a schematic side view illustrating a portion of the keyboard according to the first embodiment of the present invention, in which the keycap is depressed and the keycap is not shown. When the keycap 21 is depressed, the keycap 21 is moved downwardly to push the corresponding scissors-type connecting element 22 in response to the depressing force. As the outer frame 222 is rotated relative to the inner frame 221, the scissors-type connecting element 22 is swung. Meanwhile, the bulge 223 in the first step part 262 is moved downwardly toward the membrane switch circuit member 24 and away from the first step part 262. Moreover, as the keycap 21 is moved downwardly to push the corresponding elastic element 23, the elastic element 23 is subjected to deformation to press the membrane switch circuit member 24 and trigger the corresponding key intersection (not shown) of the membrane switch circuit member 24. Consequently, the membrane switch circuit member 24 generates a corresponding key signal. The key structure in the depressed state is shown in FIG. 6.

When the keycap 21 is no longer depressed by the user, no external force is applied to the keycap 21 and the elastic element 23 is no longer pushed by the keycap 21. In response to the elasticity of the elastic element 23, the elastic element 23 is restored to its original shape to provide an upward elastic restoring force to the keycap 21. As the outer frame 222 is rotated relative to the inner frame 221, the scissors-type connecting element 22 is swung. Consequently, the keycap 21 is returned to its original position where it is not depressed. As shown in FIG. 5, the bulge 223 is returned to the original position so as to be received in the first step part 262. In this embodiment, the range of moving the bulge 223 upwardly or downwardly is specially designed according to the travelling distance of the keycap 21. Consequently, the action of the depressing the keycap 21 is not influenced by the upward or downward movement of the bulge 223.

Figure 7:
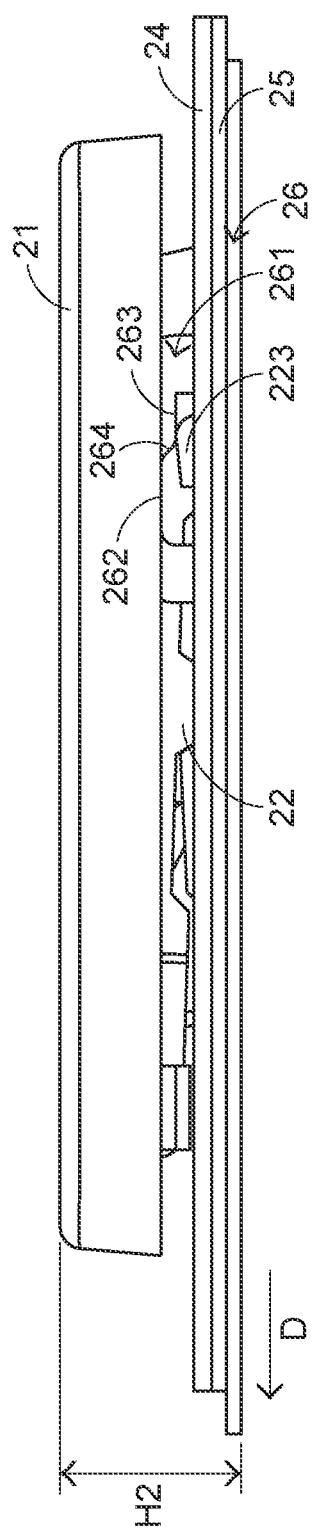
FIG. 7 is a schematic side view illustrating a portion of the keyboard according to the first embodiment of the present invention, in which the keyboard is in a stored status.

Hereinafter, a process of storing the keyboard will be illustrated with reference to FIGS. 5 and 7. FIG. 7 is a schematic side view illustrating a portion of the keyboard according to the first embodiment of the present invention, in which the keyboard is in a stored status. In case that the top cover 27 is opened, the bulge 223 is received in the first step part 262 (see FIG. 5). Meanwhile, the keycap 21 is at a first height H1. While the top cover 27 is closed to cover the keyboard base 20, the top cover 27 is rotated downwardly to push the plural linkage elements 201. As the plural linkage elements 201 are pushed by the top cover 27, the sliding plate 26 is pushed by the plural linkage elements 201. Consequently, the sliding plate 26 is moved relative to the base plate 25 in the first direction D, and the bulge 223 is pushed into the second step part 263 by the junction part 264. Meanwhile, the keycap 21 is at a second height H2. The first height H1 is higher than the second height H2.

In this embodiment, the keyboard base 20 further comprises an elastic mechanism 202 (e.g., a spring). The elastic mechanism 202 is disposed within the keyboard base 20 and contacted with the sliding plate 26. While the top cover 27 is closed to cover the keyboard base 20, the sliding plate 26 is moved in response to the above operation. Consequently, the elastic mechanism 202 is compressed by the sliding plate 26. When the top cover 27 is opened and uplifted, the elastic mechanism 202 is no longer compressed by the sliding plate 26 and thus provides an elastic force to the sliding plate 26. In response to the elastic force, the sliding plate 26 is moved to push the plural linkage elements 201. Consequently, the plural linkage elements 201 are returned to their original positions where they are not pushed by the top cover. It is noted that numerous modifications and alterations may be made while retaining the teachings of the invention. For example, in another embodiment, the elastic mechanism is installed in the plural linkage elements. When the top cover is opened and uplifted, the elastic mechanism provides an elastic force to the sliding plate. In response to the elastic force, the plural linkage elements are returned to their original positions where they are not pushed by the top cover. Since the sliding plate is no longer pushed by the plural linkage elements, the sliding plate is slid in a direction opposite to the first direction. Under this circumstance, the bulge is received in the first step part, and the keycap is returned to the original position at the first height. In some other embodiments, the plural linkage elements are pushed by hand and not pushed through the top cover. When the keyboard 2 is in the stored status, the thickness of the keyboard 2 is reduced. Due to the slim appearance, the keyboard can be easily carrier.

As mentioned above, the sliding plate 26 is disposed under the base plate 25, and the sliding plate 26 is not contacted with the membrane switch circuit member 24. Consequently, when the sliding plate 26 is moved relative to the base plate 25, the sliding plate 26 does not rub against the membrane switch circuit member 24. In other words, the membrane switch circuit member 24 is not abraded by the sliding plate 26. Moreover, since the sliding plate 26 is disposed under the base plate 25, the sliding plate 26 is pressed by the weights of the keycaps 21, the scissors-type connecting elements 22, the elastic elements 23, the membrane switch circuit member 24 and the base plate 25. Consequently, when the sliding plate 26 is moved relative to the base plate 25, the sliding plate 26 is not upturned and the action of the sliding plate 26 is kept stable.

Figure 8:
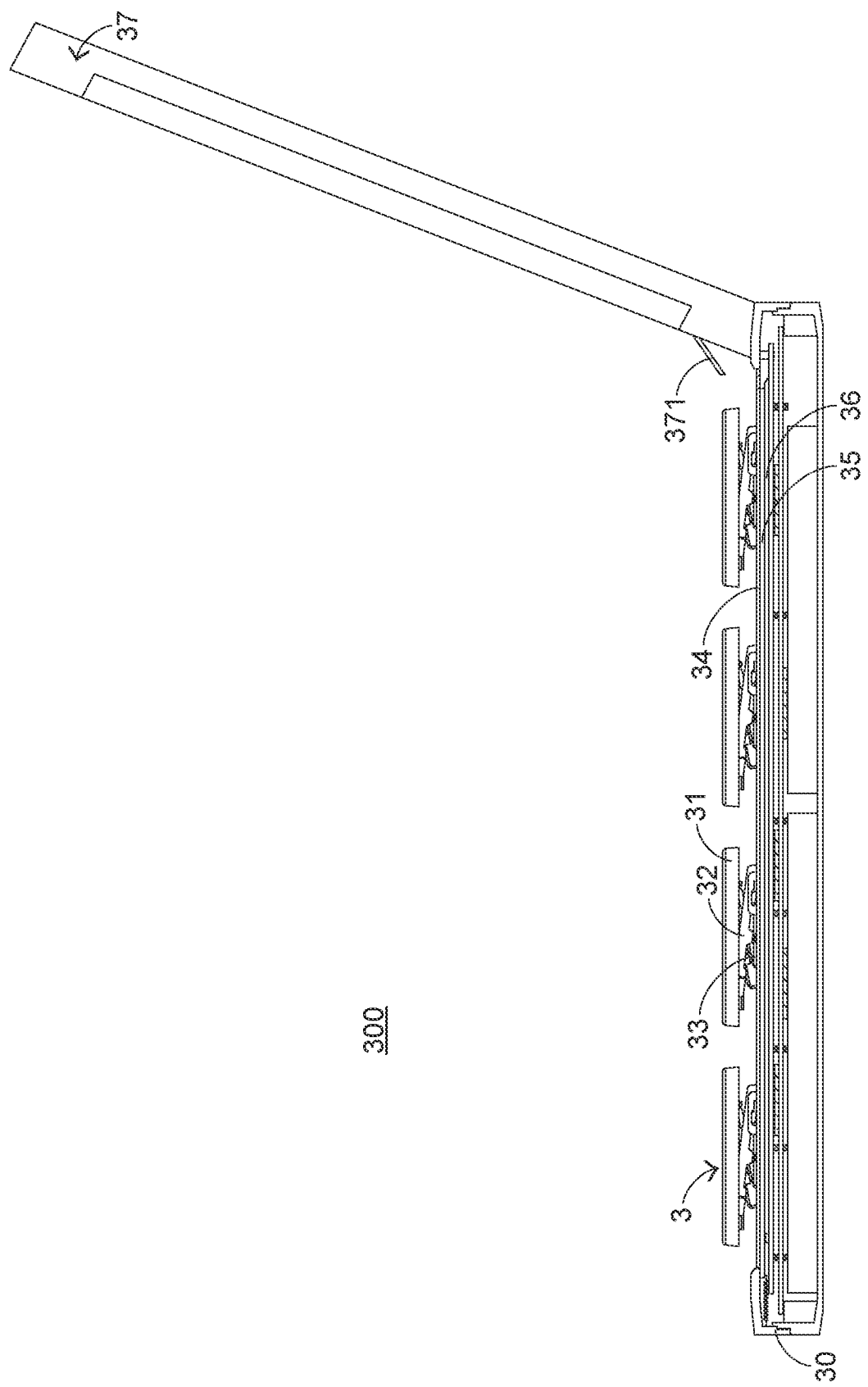
FIG. 8 is a schematic side cross-sectional view illustrating a keyboard according to a second embodiment of the present invention.

The present invention further provides a second embodiment, which is distinguished from the first embodiment. FIG. 8 is a schematic side cross-sectional view illustrating a keyboard according to a second embodiment of the present invention. The keyboard 3 comprises a keyboard base 30, plural keycaps 31, plural scissors-type connecting elements 32, plural elastic elements 33, a membrane switch circuit member 34, a base plate 35 and a sliding plate 36. The keyboard base 30 is connected with a top cover 37. The top cover 37 is rotatable relative to the keyboard base 30 to cover the keyboard base 30. Moreover, a notebook computer 300 is defined by the keyboard base 30 and the top cover 37 collaboratively. The structures of the components of the keyboard 3 which are identical to those of the first embodiment are not redundantly described herein. In comparison with the first embodiment, the top cover 37 comprises plural linkage elements 371. For succinctness, only one linkage element 371 is shown in FIG. 8. While the top cover 37 is closed to cover the keyboard base 30, the plural linkage elements 371 are inserted into the keyboard base 30 to push the sliding plate 36. Consequently, the sliding plate 36 is moved relative to the base plate 35. The operating principles of the keyboard 3 of this embodiment are similar to the keyboard 2 of the first embodiment, and are not redundantly described herein.

Figure 9A:
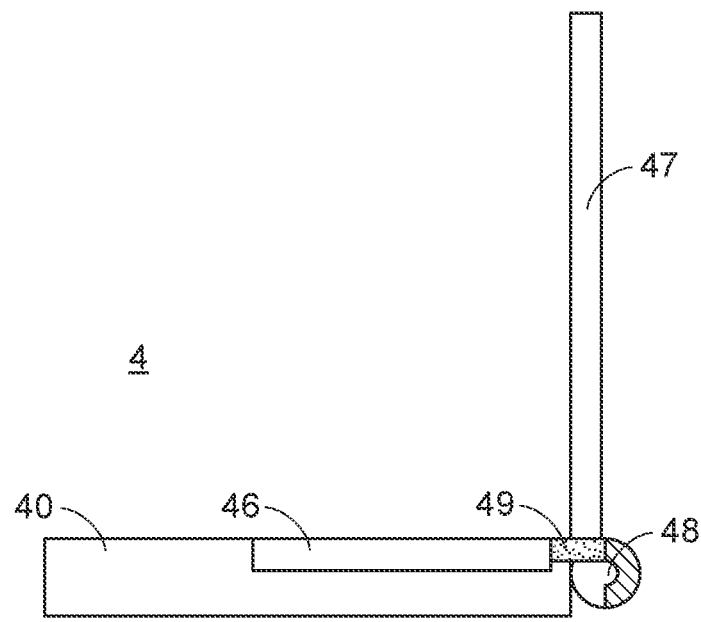
FIGS. 9A and 9B are schematic side cross-sectional views illustrating a portion of a keyboard according to a third embodiment of the present invention.
Figure 9B:
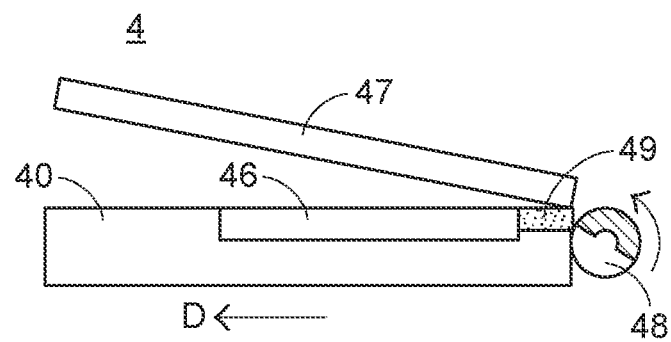

The present invention further provides a third embodiment, which is distinguished from the above embodiments. FIGS. 9A and 9B are schematic side cross-sectional views illustrating a portion of a keyboard according to a third embodiment of the present invention. As shown in FIGS. 9A and 9B, the partial structure of the keyboard 4 comprises a keyboard base 40, a sliding plate 46, a top cover 47, a rotary shaft 48 and a linkage lever 49. The structures of the keycaps, the scissors-type connecting elements, the elastic elements, the membrane switch circuit member and the base plate of the keyboard 4 are similar to those of the first embodiment. Consequently, these components are not shown in the drawings, and the detailed descriptions thereof are omitted.

The operations of the keyboard 4 will be illustrated as follows. While the top cover 47 is closed to cover the keyboard base 40, the rotary shaft 48 coupled with the top cover 47 is rotated in a counterclockwise direction to push the linkage lever 49. The linkage lever 49 is connected with the sliding plate 46. Consequently, the sliding plate 46 is moved with the linkage lever 49, and the sliding plate 46 is moved in a first direction D. Because of the cooperation of the sliding plate 46 and the position-limiting structures, the keycap is at the second height (i.e., the lower height). While the top cover 47 is opened and uplifted, the rotary shaft 48 is rotated in a clockwise direction to pull the linkage lever 49. Consequently, the sliding plate 46 is moved to its original direction, and the keycap is returned to the higher height (i.e., the higher height).

Figure 10A:
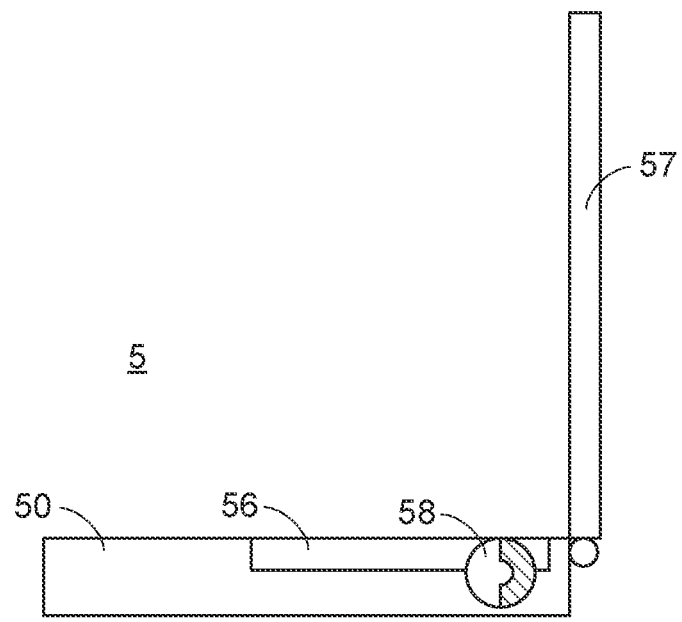
FIGS. 10A and 10B are schematic side cross-sectional views illustrating a portion of a keyboard according to a fourth embodiment of the present invention.
Figure 10B:
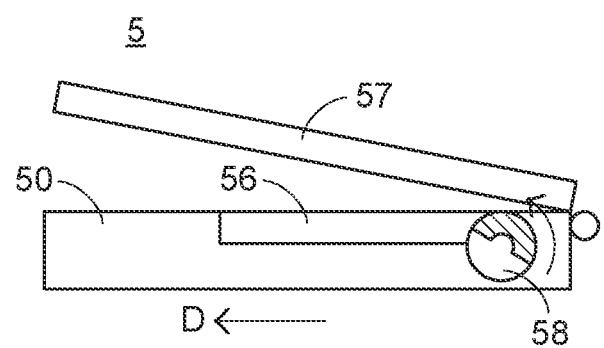

The present invention further provides a fourth embodiment, which is distinguished from the above embodiments. FIGS. 10A and 10B are schematic side cross-sectional views illustrating a portion of a keyboard according to a fourth embodiment of the present invention. As shown in FIGS. 10A and 10B, the partial structure of the keyboard 5 comprises a keyboard base 50, a sliding plate 56, a top cover 57 and a driving mechanism 58. The driving mechanism 58 is connected with the top cover 57 and the sliding plate 56. The structures of the keycaps, the scissors-type connecting elements, the elastic elements, the membrane switch circuit member and the base plate of the keyboard 5 are similar to those of the first embodiment. Consequently, these components are not shown in the drawings, and the detailed descriptions thereof are omitted.

The operations of the keyboard 5 will be illustrated as follows. While the top cover 57 is closed to cover the keyboard base 50, the driving mechanism 58 coupled with the top cover 57 is triggered and rotated in a counterclockwise direction to move the sliding plate 56 in a first direction D. Because of the cooperation of the sliding plate 56 and the position-limiting structures, the keycap is at the second height (i.e., the lower height). While the top cover 57 is opened and uplifted, the driving mechanism 58 is triggered and rotated in a clockwise direction. Consequently, the sliding plate 56 is moved to its original direction, and the keycap is returned to the higher height (i.e., the higher height).

From the above descriptions, the keyboard of the present invention has the function of changing the heights of the keys. For operating the keyboard, the bulge of the scissors-type connecting element is controlled to be received in the first step part of the position-limiting structure. Consequently, the keycap is at a higher height. Since the height of the keycap is not limited during the normal operation of the keyboard, the movable distance of the keycap is still large enough to provide better tactile feel. For storing the keyboard, the bulge of the scissors-type connecting element is controlled to be received in the second step part of the position-limiting structure. Consequently, the height of the keycap is reduced, and the keyboard has a slim appearance. In other words, the keyboard of the present invention is capable of effectively solving the drawbacks of the conventional technologies.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard, comprising:
   plural keycaps partially exposed outside the keyboard;
   plural scissors-type connecting elements, wherein each scissors-type connecting element is aligned with a corresponding keycap and connected with the corresponding keycap, wherein at least one of the plural scissors-type connecting elements has a bulge, and the bulge is protruded externally from a sidewall of the corresponding scissors-type connecting element;
   a base plate connected with the plural scissors-type connecting elements, wherein the plural keycaps and the plural scissors-type connecting elements are supported by the base plate; and
   a sliding plate disposed under the base plate, wherein when the sliding plate is pushed, the sliding plate is moved relative to the base plate, wherein the sliding plate comprises plural position-limiting structures corresponding to respective bulges, and the plural bulges are inserted into the corresponding position-limiting structures, wherein when the sliding plate is moved relative to the base plate, a relative position between each bulge and the corresponding position-limiting structure is changed, so that a height of the corresponding keycap is changed, wherein each of the plural position-limiting structure comprises:
- a first step part located at a first side of the position-limiting structure to receive the corresponding bulge;
- a second step part located at a second side of the position-limiting structure to receive the corresponding bulge, and the second step part is lower than the first step part; and
- as junction part arrange between the first step part and the second step part, wherein when the sliding place is moved relative to the base plate in a first direction, the bulge is pushed into the second step part by the junction part.

2. The keyboard according to claim 1, wherein when the bulge is received in the first step part, the keycap is at a first height, wherein the sliding plate is moved relative to the base plate in the first direction, the bulge is pushed into the second step part by the junction part and the keycap is at a second height, wherein the first height is higher than the second height.

3. The keyboard according to claim 1, further comprising:
- plural elastic elements aligned with the corresponding keycaps and disposed under the corresponding keycaps; and
- a membrane switch circuit member disposed over the base plate and contacted with the plural elastic elements so as to be triggered by the plural elastic elements.

4. The keyboard according to claim 3, wherein while the keycap is depressed, the keycap is moved relative to the base plate to push the corresponding elastic element, the corresponding elastic element is subjected to deformation to trigger the membrane switch circuit member to generate a corresponding key signal, and the scissors-type connecting element is swung to move the bulge from the first step part toward the membrane switch circuit member, wherein when the keycap is no longer depressed, the elastic element is restored to an original shape and provides an elastic restoring force, the keycap is moved to an original position in response to the elastic restoring force, and the scissors-type connecting element is swung to return the bulge back to the first step part.

5. A keyboard comprising:
- plural keycaps partially exposed outside the keyboard;
- plural scissors-type connecting elements, wherein each scissors-type connecting element is aligned with a corresponding keycap and connected with the corresponding keycap, wherein at least one of the plural scissor-type connecting elements has a bulge, and the bulge is protruded externally from a sidewall of the corresponding scissors-type connecting element;
- a base plate connecting with the plural scissors-type connecting elements, wherein the plural keycaps and the plural scissors-type connecting elements are supported by the base plate; and
- a sliding plate disposed under the base plate, wherein when the sliding plate is pushed, the sliding plate is moved relative to the base plate, wherein the sliding plate comprises plural position-limiting structures corresponding to respective bulges, and the plural bulges are inserted into the corresponding position-limiting structures, wherein when the sliding plate is moved relative to the base plate, a relative position between each bulge and the corresponding position-limiting structure is changed, so that a height of the corresponding keycap is changed, wherein each scissors-type connecting element comprises:
- an inner frame, wherein a first end of the inner frame is connected with the corresponding keycap, and a second end of the inner frame is connected with the base plate; and
- an outer frame combined with the inner frame and rotatable relative to the inner frame, wherein a first end of the outer frame is connected with the base plate, a second end of the outer frame is connected with the corresponding keycap, and the bulge is disposed on a sidewall of the outer frame.

6. The keyboard according to claim 5, wherein the bulge is integrally formed with the outer frame.

7. The keyboard according to claim 5, wherein the keycap further comprises:
- a first keycap hook located at a first side of the keycap and connected with the first end of the inner frame; and
- a second keycap hook located at a second side of the keycap and connected with the second end of the outer frame.

8. The keyboard according to claim 5, wherein the base plate further comprises:
- plural first base plate hook, wherein each first base plate hook is connected with the first end of the corresponding outer frame; and
- plural second base plate hooks, wherein each second base plate hook is connected with the second end of the corresponding inner frame.

9. The keyboard according to claim 1, wherein the keyboard further comprises a keyboard base, and the keyboard base is connected with a top cover, wherein the keyboard base comprises at least one linkage element, and the at least one linkage element is contacted with the sliding plate, wherein while the top cover is closed to cover the keyboard base, the at least one linkage element is pushed by the top cover, and the sliding plate is pushed by the at least one linkage element, so that the sliding plate is moved relative to the base plate.

10. The keyboard according to claim 1, wherein the keyboard further comprises a keyboard base, the keyboard base is connected with a top cover, and the top cover comprises at least one linkage element, wherein while the top cover is closed to cover the keyboard base, the sliding plate is pushed by the at least one linkage element, so that the sliding plate is moved relative to the base plate.

11. The keyboard according to claim 5, wherein the keyboard further comprises a keyboard base, and the keyboard base is connected with a top cover, wherein the keyboard base comprises at least one linkage element, and the at least one linkage element is contacted with the sliding plate, wherein while the top cover is closed to cover the keyboard base, the at least one linkage element is pushed by the top cover, and the sliding plate is pushed by the at least one linkage element, so that the sliding plate is moved relative to the base plate.

12. The keyboard according to claim 5, wherein the keyboard further comprises a keyboard base, the keyboard base is connected with a top cover, and the top cover comprises at least one linkage element, wherein while the top cover is closed to cover the keyboard base, the sliding plate is pushed by the at least one linkage element, so that the sliding plate is moved relative to the base plate.

\* \* \* \* \*